Sept. 4, 1934.    S. P. MILLER    1,972,157
VACUUM DISTILLATION
Filed Jan. 16, 1929
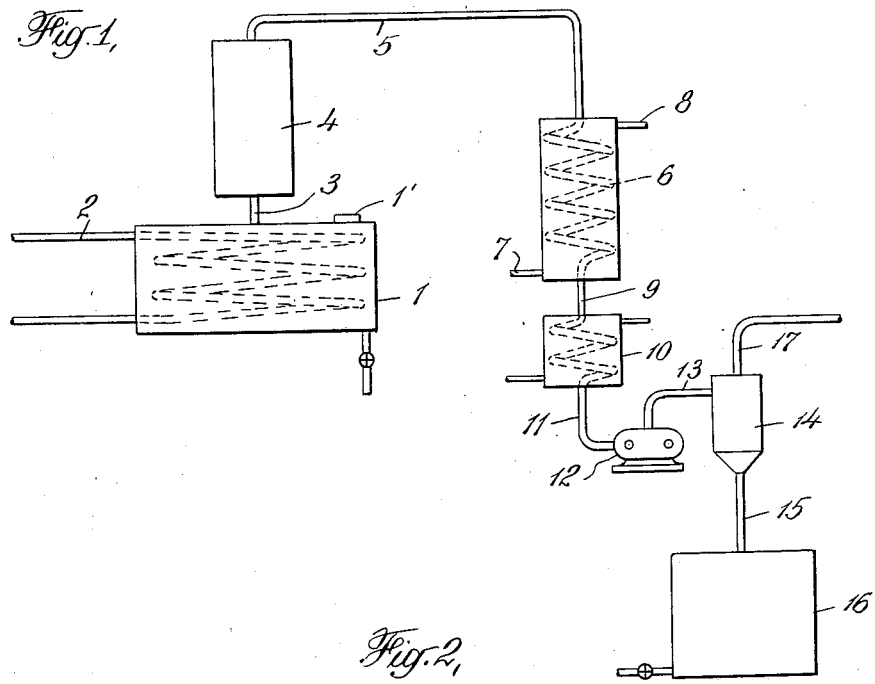
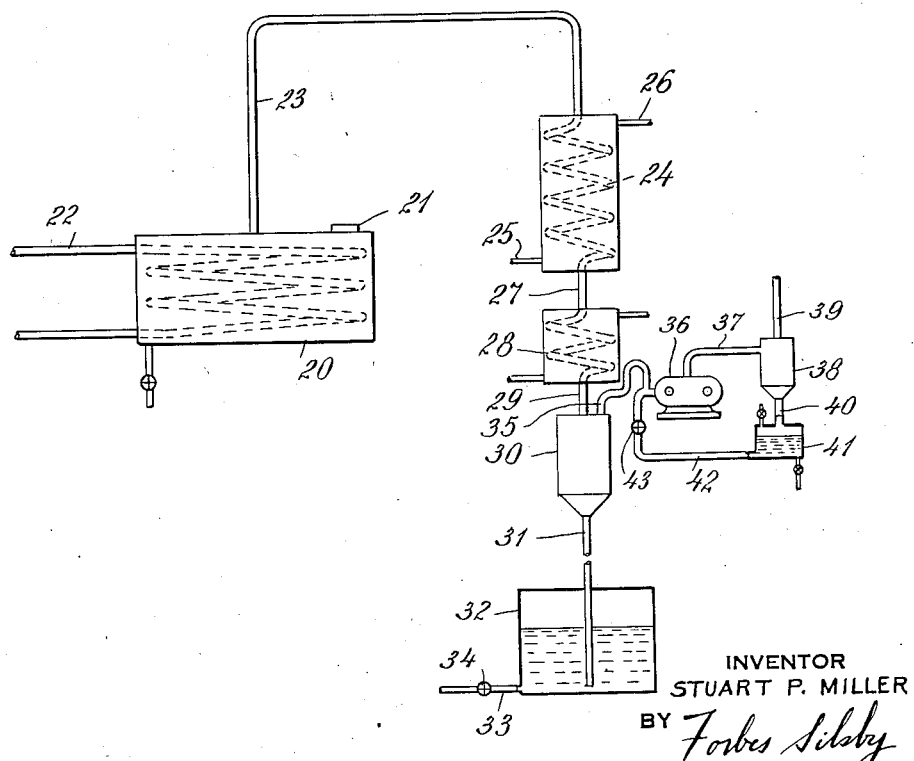
INVENTOR
STUART P. MILLER
BY Forbes Silsby
ATTORNEY Patented Sept. 4, 1934

1,972,157

UNITED STATES PATENT OFFICE 1,972,157

VACUUM DISTILLATION

Stuart Parmelee Miller, Englewood, N. J., assignor to The Barrett Company, New York, N. Y., a corporation of New Jersey Application January 16, 1929, Serial No. 332,930
In Canada December 4, 1928

18 Claims. (Cl. 202—52)

This invention relates to the distillation of materials in such a manner that a purified or refined product can be obtained without the waste of a large amount of material and without giving rise to excessive mechanical difficulties or requiring highly developed technical skill for the operation of the process. The invention relates particularly to the distillation of materials which are normally solid at atmospheric temperature, or which have a tendency to sublime, i. e., which have a substantial vapor pressure at or about their melting point and which, therefore, tend to vaporize in appreciable quantities when in the liquid phase, and the term "normally solid material" as used hereinafter refers to materials which are normally solid at atmospheric temperature.

The invention will be particularly described in connection with the purification of crude or semi-purified naphthalene and crude or semi-purified phthalic anhydride, but it is to be understood that it is not restricted to these products as it can be used for purifying or refining many other materials, as, for example, anthracene and betanaphthol.

Heretofore naphthalene and phthalic anhydride have been distilled in fire heated stills in which the products of combustion impinged directly upon the outside of the stills thus frequently causing local overheating, the formation of large amounts of decomposition products such as tar, and, in the case of phthalic anhydride, a hard coke residue which must be dug out of the still following each run, and a constant menace on account of the fire hazard due to the flames. In the distillation of these materials attempts have been made to avoid the excessive decomposition and other operating difficulties attendant upon the use of fire heated stills by carrying out the distillation under a vacuum permitting the maintenance of lower temperatures and thus decreasing decomposition, but these attempts have proven unsatisfactory particularly on account of the tendency of naphthalene and phthalic anhydride, both of which are normally solid at atmospheric temperature, to vaporize or sublime due to their substantial vapor pressure at or about their melting point. It has been attempted to maintain the vacuum in such systems by withdrawing the uncondensed gases (consisting primarily of air leakage into the system) through a vacuum pump. The tendency of the naphthalene or phthalic anhydride to vaporize has, however, rendered operation of this process commercially unsatisfactory due to clogging up of the vacuum lines and the vacuum pump due to subsequent condensation of the vapor into the solid phase. Furthermore, operation in the manner described has inevitably resulted in an excessive loss of the material undergoing distillation, in the form of vapor thereof present in the uncondensed residual gases (air leakage) discharged from the system. It is, of course, practically impossible to completely prevent air leakage into a vacuum system in commercial operation and, due to the high vapor pressure of materials such as naphthalene or phthalic anhydride at about their melting point and above an appreciable amount of the vapor of these materials has necessarily been swept out of the system and lost when operating in the manner described above using a vacuum pump for exhaustion of the system of uncondensed gases to maintain the required vacuum.

It is the object of this invention to provide a process and apparatus adapted to overcome the above disadvantages and to permit the successful distillation under vacuum upon a commercial scale of normally solid materials or materials which possess a tendency to sublime.

I have discovered that the aforementioned difficulties are entirely eliminated and loss of the material being distilled through decomposition and as vapor in the uncondensed residual gases discharged from the system is substantially avoided by conducting the distillation operation under vacuum and then providing for maintenance of the vacuum by withdrawing the residual uncondensed gases jointly with a liquid from the system. This withdrawal is preferably accomplished by means of a vacuum pump employing a liquid seal. The sealing liquid is preferably one which is miscible with the material being distilled, is preferably maintained above the melting point of the material being distilled, and may, for example, consist of the material being distilled. In the latter case the sealing liquid will preferably consist of the condensate from the vacuum distillation and condensing system. By operating in this manner any vaporized naphthalene or phthalic anhydride which tends to deposit as solid material in the line leading to the vacuum pump and in the pump itself will be dissolved or washed out of the system and will not accumulate and finally clog the pump, as occurs when using a dry vacuum pump. My method has the further advantage that the distillate may, if desired, be discharged at atmospheric pressure and that losses of vapor in the uncondensed gases discharged from the system are minimized due to absorption or condensation of the vapors in the sealing liquid during the passage of the uncondensed gases and sealing liquid through the vacuum pump.

The invention will be understood from the description in connection with the accompanying drawing, in which Fig. 1 is a diagrammatic illustration of a system in which the uncondensed gases are withdrawn jointly with the condensate from the system, and Fig. 2 is an illustration of a modification in which the uncondensed gases are withdrawn from the system jointly with a liquid other than condensate.

In the drawing, reference character 1 indicates a still having a charging opening 1' and which may be heated by means of a steam coil 2. A conduit 3 leads from the upper portion of the still 1 to the partial condenser or baffle column 4, and a conduit 5 leads from the top of this apparatus to the final condenser 6 for the vapors which pass over from the partial condenser 4. The final condenser 6 may be cooled in any suitable manner, as, for example, by introducing a cooling fluid through the pipe 7 and withdrawing the same through the pipe 8. A conduit 9 leads from the condenser 6 to a cooler 10 adapted to cool to a regulated temperature the liquid condensate coming from the condenser 6 and which may, of course, also act to condense remaining uncondensed naphthalene vapor. A conduit 11 leads from the cooler 10 to a vacuum pump 12. The pump 12 may be any type of vacuum pump adapted to handle both gas and liquid, commonly referred to as a wet vacuum pump, and preferably is a rotary positive displacement high vacuum air pump adapted to operate with a liquid seal. From the outlet of the pump 12 a conduit 13 leads to a separator 14. A conduit 15 leads from the separator 14 to a storage tank 16 and conduit 17 leads from the separator 14 to the atmosphere.

An example of a method of practicing my invention employing the apparatus above described is as follows: Crude or partially purified naphthalene, for instance, is introduced into the still 1 through the charging opening 1', the charging opening is closed, and steam is admitted into the steam coil 2 at such a pressure that the naphthalene will be maintained at the proper temperature for causing distillation thereof. It has been found that steam at a pressure of about 185–200 lbs. is suitable for this purpose, although the pressure of the steam may of course be varied over a wide range depending upon the material distilled and the vacuum being maintained. The vapors from the naphthalene first pass through the partial condenser 4, which is controlled to condense higher boiling impurities but to permit naphthalene vapor to escape from the top thereof. The purified naphthalene vapor then passes into the final condenser 6 wherein it is condensed to the liquid phase and from there into the cooler 10 wherein the liquid naphthalene is partially cooled, but only to a temperature substantially above its solidifying point, so that the wet vacuum pump 12 will always receive liquid condensate from the cooler 10. The wet vacuum pump 12 withdraws the liquid condensate together with the uncondensed gases, (which, as indicated above, consist principally of air leakage), from the vacuum system and passes the liquid naphthalene, (now under atmospheric pressure), and uncondensed gases into the separator 14 from whence the liquid naphthalene passes through the conduit 15 into storage tank 16 while the uncondensed gases escape through the conduit 17. Any traces of naphthalene vapor in the gases discharged through conduit 17 may of course be recovered if desired by passing the gases through a further condensing chamber.

As above indicated, the wet vacuum pump 12 discharges jointly from the system liquid naphthalene condensate and the uncondensed gases, thereby maintaining the vacuum in the system. The pump 12 should of course be proportioned of substantially greater capacity than is required to handle the quantity of condensate produced by the system in the normal operation thereof. The gas handling capacity of the pump, that is, the capacity of the pump over that required to handle the normal production of condensate, should of course be sufficient to take care of the normal air leakage into the system. It should be understood that the system need not always be operated to produce the normal amount of condensate, but in fact it is only necessary in the practice of my invention that the pump receive sufficient liquid to act as a seal so that the pump will operate to create and maintain a vacuum in the system. This amount of liquid required to seal the pump may be considerably less than the normal production of condensate.

By proportioning the pump so that its total capacity does not greatly exceed the capacity required to handle both the normal production of condensate and the normal air leakage or uncondensed gases in the system, the pump may be used as an automatic regulator to prevent an excessive rate of distillation. Under these conditions, any considerable increase in the rate of distillation will flood the pump with liquid condensate, thereby temporarily reducing the gas handling capacity of the pump. This immediately results in lowering the vacuum in the system and as the absolute pressure in the system rises, the rate of vaporization in the still 1 rapidly decreases. As soon as the rate of distillation has decreased and the pump clears itself of excess liquid it again functions as an evacuator of the uncondensed gases in the system, the vacuum rises, and distillation begins again.

Due to the joint withdrawal of the liquid naphthalene condensate and the uncondensed gases through the same outlet, viz., the wet vacuum pump 12, the naphthalene vapor present in the air is in intimate contact with liquid naphthalene as the mixture of the two passes through the pump, and, due to the further fact that the mixture issuing from the pump is under atmospheric pressure, the loss of naphthalene vapor in the uncondensed gas discharged from the system is much less than when employing a dry vacuum pump due to absorption of naphthalene vapor in the liquid naphthalene condensate at its point of discharge.

In Fig. 2 is illustrated a modification of my invention in accordance with which the uncondensed gases in the system may be withdrawn therefrom jointly with a liquid other than the condensate produced in the system. In this modification of my invention numeral 20 represents a still which may be of the same type as the still of Fig. 1 and which is provided with a charging opening 21 and is heated by means of a steam coil 22. A conduit 23 leads from the upper portion of the still 20 to a condenser 24. In this modification I have omitted to illustrate a partial condenser as shown in Fig. 1 between the still and the total condenser 24, since the use of a partial condenser is not essential to the practice of my invention. The condenser 24 may be cooled in any suitable manner, as, for example, by introducing a cooling fluid through the pipe 25 and withdrawing the same through the pipe 26. A conduit 27 leads from the condenser 24 to a cooler 28 adapted to effect further condensation and/or to cool to a regulated temperature the liquid condensate coming from the condenser 24. This cooler may also be omitted if so desired. A conduit 29 leads from the cooler 28 to a separator 30. The separator 30 is provided with a vacuum leg 31 which extends downwardly into storage tank 32 adapted to be sealed and maintained under vacuum, and from which the condensate may be withdrawn from time to time as desired through a drawoff pipe 33 provided with valve 34. A conduit 35 for uncondensed gases leads from the separator 30 to a wet vacuum pump 36. A conduit 37 leads from the outlet of the pump 36 to a second and smaller separator 38, from which the uncondensed gases discharged from the vacuum system escape to the atmosphere through outlet 39 while the sealing liquid discharged from the pump returns through line 40 to reservoir 41. Reservoir 41 is connected through line 42 and valve 43 with conduit 35 leading to pump 36.

An example of the operation of this modification of my invention is as follows: Crude or partially purified naphthalene is introduced into the still 20 through the charging opening 21, the charging opening is closed and then steam is admitted into the steam coil 22 under sufficient pressure to cause distillation of the naphthalene in the manner described in connection with Fig. 1. The naphthalene vapor passes out of the still through conduit 23 into the condenser 24 wherein it is condensed to the liquid phase, and from there into the cooler 28, wherein the liquid naphthalene is further cooled, but again only to a temperature safely above its solidifying point so that liquid naphthalene will always be supplied to the separator 30. In the separator 30 the liquid naphthalene is separated from the uncondensed gases which have passed through the condenser and cooler and runs downwardly through the vacuum leg 31 into the storage tank 32, from whence it may be withdrawn as desired. The vacuum leg 31 should, of course, be long enough to allow holding of the desired vacuum without danger of the naphthalene collected in the storage tank being sucked back into the system.

The uncondensed gases, after separation from the liquid condensate in separator 30, escape through conduit 35 and are withdrawn from the system through the wet vacuum pump 36. After passing through the pump the gases, now under atmospheric pressure, are separated from the sealing liquid from the pump in separator 38 and pass to the atmosphere through conduit 39. The wet vacuum pump 36, instead of employing as the sealing liquid the condensate from the system as in Fig. 1, is provided with the proper amount of sealing liquid by adjusting the valve 43 in line 42 so that a supply of sealing liquid circulates from reservoir 41 through line 42 to the pump and then returns through conduit 37, separator 38, and line 40, to reservoir 41, thus providing a closed circulatory system for the sealing liquid.

The sealing liquid employed in this modification of my invention may be of any suitable type. When distilling naphthalene, for instance, liquid naphthalene itself may be used to seal the pump, or any suitable oil, e. g., creosote oil, or a heavy petroleum naphtha in which naphthalene is soluble, may be used. If such an oil is used, the temperature of the sealing liquid may be kept lower than when melted naphthalene is used, although this is not essential. In case the sealing liquid solidifies at ordinary temperatures, the reservoir 41 and the lines connecting same with the pump 36 may be heated. Preferably the sealing liquid employed is one having a relatively low vapor pressure at ordinary temperatures, such as creosote oil, in order that excessive loss of the sealing liquid through volatilization may be avoided.

The system just described possesses certain advantages over the system of Fig. 1 in which the wet vacuum pump is sealed by means of the condensate. In the system of Fig. 2 the wet vacuum pump used may be considerably smaller than in Fig. 1, since the pump does not have to handle the condensate from the system as well as the uncondensed gases. Further, when distilling corrosive materials the pump may be sealed with a noncorrosive liquid other than the distillate and even with a liquid which will neutralize any corrosive effect. Also in case the material being distilled has a very high melting point, any possible difficulty due to solidification in the pump may be avoided by sealing the pump with a solvent for the product distilled. This latter method of operation also possesses the distinct advantage that any vapor of the material being distilled present in the uncondensed gases passing through the wet vacuum pump is dissolved in the circulating solvent sealing liquid and may thus be recovered very effectively rather than lost in the exhaust gases.

It is clear that many changes may be made in the processes above described without departing from the spirit of my invention and I do not desire that the same be limited except as defined in the appended claims. For example, in the process of Fig. 2 it is not essential that the sealing liquid be recirculated through the wet vacuum pump, but instead the sealing liquid might be supplied continuously to the inlet of the pump from a source extraneous to the system and might then be discharged from the pump to waste or to a suitable recovery apparatus without returning to the vacuum system. This procedure might be used, for instance, when employing water or other liquid of negligible cost as the sealing liquid, or where a large supply of sealing oil, e. g., creosote, is available. Another modification of the invention which may be employed if desired is that wherein a portion only of the condensate is allowed to pass from the final condenser or cooler to the wet vacuum pump to act as a sealing liquid, the remainder of the condensate being passed to a vacuum receiver as in Fig. 2.

This application is a continuation-in-part of application Serial No. 693,956, filed Feb. 20, 1924.

What is claimed is:

1. A process of distilling normally solid organic material having a tendency to sublime, and having its boiling point above its melting point, in a vacuum system, which comprises heating the material in a distillation zone to vaporize it, passing the vapors into a condensing zone and therein condensing the vapors to a liquid condensate, sealing said system with a liquid which is miscible with said condensate, and maintaining the distillation zone under vacuum by withdrawing from said system uncondensed gases and said sealing liquid under such conditions that the condensate is maintained in liquid form.

2. A process of distilling naphthalene in a vacuum system, which comprises heating naphthalene in a distillation zone to vaporize it, passing the vapors into a condensing zone and therein condensing the vapors to form a liquid condensate, sealing said system with a liquid which is miscible with liquid naphthalene, and maintaining said system under vacuum by withdrawing from said system uncondensed gases and said sealing liquid under such conditions that the condensate is maintained in liquid form.

3. A process of distilling phthalic anhydride in a vacuum system, which comprises heating phthalic anhydride in a distillation zone to vaporize it, passing the vapors into a condensing zone and therein condensing the vapors to form a liquid condensate, sealing said system with a liquid which is miscible with liquid phthalic anhydride, and maintaining said system under vacuum by withdrawing from said system uncondensed gases and said sealing liquid under such conditions that the condensate is maintained in liquid form.

4. A process of distilling normally solid organic material having a tendency to sublime, and having its boiling point above its melting point, in a vacuum system, which comprises heating the material in a distillation zone to vaporize it, passing the vapors into a condensing zone and therein condensing the vapors to a liquid condensate, sealing said system with liquid condensate, and maintaining the distillation zone under vacuum by withdrawing from said system uncondensed gases and condensate while maintaining the condensate in liquid form.

5. A process of distilling naphthalene in a vacuum system which comprises heating naphthalene in a distillation zone to vaporize it, passing the naphthalene vapors into a condensing zone and therein condensing the vapors to a liquid condensate, sealing the system with liquid naphthalene from said condensing zone, and maintaining said system under vacuum by jointly withdrawing from said system uncondensed gases and naphthalene condensate while maintaining said naphthalene condensate in liquid form.

6. A process of distilling phthalic anhydride in a vacuum system which comprises heating phthalic anhydride in a distillation zone to vaporize it, passing the phthalic anhydride vapors into a condensing zone and therein condensing the vapors to a liquid condensate, sealing the system with liquid phthalic anhydride from said condensing zone, and maintaining said system under vacuum by jointly withdrawing from said system uncondensed gases and phthalic anhydride condensate while maintaining said phthalic anhydride condensate in liquid form.

7. A process of distilling normally solid organic material having a tendency to sublime, and having its boiling point above its melting point, in a vacuum system, which comprises heating the material in a distillation zone to vaporize it, passing the vapors into a condensing zone and therein condensing the vapors to a liquid condensate, sealing said system with a liquid which is a solvent for said material, said solvent having a relatively low vapor pressure at ordinary temperatures, and maintaining said system under vacuum by jointly withdrawing from said system uncondensed gases and said sealing liquid.

8. A process of distilling normally solid organic material having a tendency to sublime, and having its boiling point above its melting point, in a vacuum system, which comprises heating the material in a distillation zone to vaporize it, passing the vapors into a condensing zone and therein condensing the vapors to a liquid condensate, and maintaining the vacuum in said distillation zone by sealing said system with a liquid miscible with said liquid condensate and withdrawing uncondensed gases through said liquid seal under such conditions that the seal is maintained in liquid form.

9. A process of distilling normally solid organic material having a tendency to sublime, and having its boiling point above its melting point, in a vacuum system, which comprises heating the material in a distillation zone to vaporize it, passing the vapors into a condensing zone and therein condensing the vapors to a liquid condensate, maintaining said system under vacuum by sealing a wet vacuum pump with a liquid miscible with said liquid condensate, and jointly withdrawing from said system through said pump uncondensed gases and condensate from said condensing zone while maintaining the condensate in liquid form.

10. A process of distilling normally solid organic material having a tendency to sublime, and having its boiling point above its melting point, in a vacuum system, which comprises heating the material in a distillation zone to vaporize it, passing the vapors into a condensing zone and therein condensing the vapors to a liquid condensate, and maintaining a vacuum in said distillation zone by sealing a wet vacuum pump with said material in liquid condition and jointly withdrawing from said system through said pump uncondensed gases and condensate from said condensing zone while maintaining the condensate in liquid form.

11. A process of distilling normally solid organic material having a tendency to sublime, and having its boiling point above its melting point, in a vacuum system, which comprises vaporizing said material in a distillation zone, passing the vapors into a condensing zone and therein condensing the vapors to a liquid condensate, and maintaining a vacuum in said distillation zone by sealing a wet vacuum pump with liquid condensate from said condensing zone and jointly withdrawing from said system through said pump uncondensed gases and condensate from said condensing zone while maintaining said vacuum pump at a temperature above the melting point of the condensate.

12. In the process of distilling normally solid organic material having a tendency to sublime, and having its boiling point above its melting point, in a vacuum system by vaporizing said normally solid material in a distillation zone under vacuum, passing the vapors into a condensing zone and therein condensing the vapors to form a liquid condensate, the improvement which comprises maintaining the vacuum in said system by sealing said system with a liquid, jointly withdrawing from said system uncondensed gases and sealing liquid, separating said uncondensed gases from said sealing liquid, returning said sealing liquid into the vacuum system, and again withdrawing sealing liquid jointly with uncondensed gases.

13. In the process of distilling normally solid organic material having a tendency to sublime, and having its boiling point above its melting point, in a vacuum system by vaporizing said normally solid material in a distillation zone under vacuum, passing the vapors into a condensing zone and therein condensing the vapors to form a liquid condensate, the improvement which comprises maintaining the vacuum in said distillation zone by jointly withdrawing from said system through a wet vacuum pump uncondensed gases and a liquid comprising a solvent for said material, separating said uncondensed gases from said solvent liquid, returning said solvent liquid to the inlet of said pump to seal said pump, and again withdrawing the solvent liquid jointly with additional uncondensed gases.

14. In a distillation apparatus, a still for vaporizing normally solid material, a condenser for condensing vapors from said still to a liquid condensate, means connected to said condenser for collecting said condensate, and means for maintaining a vacuum in said still, said means comprising a pump for jointly discharging uncondensed gases and a sealing liquid, means for separating uncondensed gases from said discharged sealing liquid, and means for returning said separated sealing liquid to said pump.

15. Distillation apparatus comprising a still for vaporizing normally solid material having a substantial vapor pressure at the melting point thereof, a condenser for condensing vapors from said still, a vacuum pump having a liquid seal and communicating with said condenser for withdrawing uncondensed vapors from said condenser, and means for supplying a sealing liquid to said pump.

16. Distillation apparatus comprising a still for vaporizing normally solid material, a condenser for condensing vapors from said still, a vacuum pump having a liquid seal, said pump being adapted to jointly discharge sealing liquid and uncondensed vapors from said condenser, and means for returning to said pump sealing liquid discharged from said pump.

17. Distillation apparatus comprising a still for vaporizing normally solid material having a substantial vapor pressure at the melting point thereof, a condenser for condensing vapors from said still to form a liquid condensate, means for sealing said system with a liquid miscible with said liquid condensate, and means for withdrawing uncondensed gases from said system through said seal.

18. Distillation apparatus comprising a still for vaporizing normally solid material, a condenser for condensing vapors from said still, a vacuum pump having a liquid seal, said pump being adapted jointly to discharge sealing liquid and uncondensed vapors from said condenser, and means for supplying sealing liquid to said pump, said means comprising a closed circulating system for returning to said pump sealing liquid discharged from said pump.

STUART PARMELEE MILLER.